United States Patent
Hsiao et al.

(10) Patent No.: US 10,509,583 B1
(45) Date of Patent: Dec. 17, 2019

(54) MEMORY MANAGEMENT METHOD AND STORAGE CONTROLLER

(71) Applicant: Shenzhen EpoStar Electronics Limited CO., Shenzhen (CN)

(72) Inventors: Yu-Hua Hsiao, Hsinchu County (TW); Chin-Yen Ko, Changhua County (TW); Li-Hsun Liu, Taoyuan (TW)

(73) Assignee: Shenzhen EpoStar Electronics Limited CO., Shenzhen (CN)

(*) Notice: Subject to any disclaimer, the term of this patent is extended or adjusted under 35 U.S.C. 154(b) by 0 days.

(21) Appl. No.: 16/136,282

(22) Filed: Sep. 20, 2018

(30) Foreign Application Priority Data

Jul. 26, 2018 (TW) .............................. 107125833 A

(51) Int. Cl.
*G06F 12/00* (2006.01)
*G06F 3/06* (2006.01)

(52) U.S. Cl.
CPC .......... *G06F 3/0643* (2013.01); *G06F 3/0604* (2013.01); *G06F 3/0679* (2013.01)

(58) Field of Classification Search
CPC ..... G06F 3/0643; G06F 3/0604; G06F 3/0679
USPC ........................................................ 711/154
See application file for complete search history.

(56) References Cited

U.S. PATENT DOCUMENTS

| | | | |
|---|---|---|---|
| 2011/0066899 A1* | 3/2011 | Kang | G06F 11/1068 714/54 |
| 2013/0080858 A1* | 3/2013 | Lee | G11C 16/26 714/773 |
| 2013/0176784 A1 | 7/2013 | Cometti et al. | |
| 2018/0047444 A1 | 2/2018 | Pignatelli et al. | |

FOREIGN PATENT DOCUMENTS

| | | |
|---|---|---|
| CN | 108170366 | 6/2018 |
| CN | 108255739 | 7/2018 |
| TW | 201608475 | 3/2016 |
| TW | 201732617 | 9/2017 |

OTHER PUBLICATIONS

"Office Action of Taiwan Counterpart Application," dated Sep. 4, 2019, pp. 1-4.

* cited by examiner

*Primary Examiner* — Mardochee Chery
(74) *Attorney, Agent, or Firm* — JCIPRNET

(57) ABSTRACT

A memory management method is provided. The method includes performing a read retry operation to a target block stripe, and identifying a read retry recording table of the target block stripe; selecting a target read retry index value from one or more first read retry index values according to the one or more first read retry index values in the read retry recording table; using a target read retry option corresponding to the read retry index value to perform a read operation to the target block stripe; in response to determining that the read operation is successful, determining that the read retry operation is completed, and updating the read retry recording table according to the target read retry index value; and determining whether to perform a wear leveling operation to the target block stripe according to the latest read retry recording table.

12 Claims, 8 Drawing Sheets

Read retry recording table

| RRI(1) | RRI(2) | ... | RRI(X) |
|---|---|---|---|
| RRW(1) | RRW(2) | ... | RRW(X) |

Read retry index value RRI
Read retry weighting value RRW

X fields

MEMORY MANAGEMENT METHOD AND STORAGE CONTROLLER

CROSS-REFERENCE TO RELATED APPLICATION

This application claims the priority benefit of Taiwan application serial no. 107125833, filed on Jul. 26, 2018. The entirety of the above-mentioned patent application is hereby incorporated by reference herein and made a part of this specification.

BACKGROUND OF THE DISCLOSURE

Field of the Disclosure

The disclosure relates to a memory management method, and more particularly to a memory management method and a storage controller suitable for a storage device equipped with a rewritable non-volatile memory module.

Description of Related Art

In general, in order to extend the lifetime of a rewritable non-volatile memory module, the physical erasing unit (physical block) in the rewritable non-volatile memory module is used as evenly as possible. The conventional wear leveling operation (WL operation) is performed by replacing the physical erasing unit that stores data with a free physical erasing unit after the rewritable non-volatile memory module performs operation for a fixed period of time, such that the physical erasing unit at a lower loss (e.g., with less erase count) serves as a spare physical erase unit for use.

In addition, after the data is moved from the original physical erasing unit to the idle physical erasing unit via the wear leveling operation, the idle physical erasing unit is classified into the data area to become a new data physical erasing unit, and such data becomes "fresh" data. In addition, the error bit value obtained by reading this "fresh" data is lower. That is to say, in the case of reading a new data physical erasing unit, it is less likely to cause read retry operation due to high error bit value.

Based on the above phenomenon, it is a goal for practitioners of the field to achieve how to effectively select an object to be subjected to the wear leveling operation without using erase count, write count, or read count, while reducing the number of times that the storage device performs the read retry operation, thereby improving the access efficiency of the rewritable non-volatile memory module and the stability of the stored data.

SUMMARY OF THE DISCLOSURE

The disclosure provides a memory management method, capable of correspondingly adjusting a read operation with respect to a specific physical block through a plurality of read retry operations that are performed, and selecting an object to be subjected to a wear leveling operation (WL operation) to perform the WL operation, thereby reducing read retry operation and maintaining stability of the stored data.

An embodiment of the disclosure provides a memory management method, adapted for a storage device equipped with a rewritable non-volatile memory module, wherein the rewritable non-volatile memory module has a plurality of physical blocks. The plurality of physical blocks are grouped into a plurality of block stripes. The method includes the following steps: performing a read retry operation to a target block stripe of the plurality of block stripes, and identifying a read retry recording table of the target block stripe, wherein the read retry recording table records a plurality of fields, wherein the plurality of fields record a plurality of read retry index values and a plurality of read retry weighting values respectively corresponding to a plurality of completed read retry operations; in response to one or more first read retry index values that have not been selected in the read retry recording table of the target block stripe, selecting one target read retry index value from the one or more first read retry index values according to a read retry weighting value of the one or more first read retry index values; using a target read retry option corresponding to the target read retry index value to perform a read operation to the target block stripe; in response to determining that the read operation is successful, determining that the read retry operation is completed, and updating the read retry recording table according to the target read retry index value; and determining whether to perform the WL operation to the target block stripe according to the latest read retry recording table.

An embodiment of the disclosure provides a storage controller for controlling a storage device equipped with a rewritable non-volatile memory module. The storage controller includes: a connection interface circuit, a memory interface control circuit, a block stripe management circuit unit and a processor. The connection interface circuit is coupled to a host system. The memory interface control circuit is coupled to the rewritable non-volatile memory module, wherein the rewritable non-volatile memory module has a plurality of physical blocks, wherein the plurality of physical blocks are grouped into a plurality of block stripes. The processor is coupled to the connection interface circuit, the memory interface control circuit and the block stripe management circuit unit, and is configured to instruct the block stripe management circuit unit to perform a read retry operation to a target block stripe of the plurality of block stripes. The block stripe management circuit unit is configured to identify a read retry recording table of the target block stripe, wherein the read retry recording table records a plurality of fields, wherein the plurality of fields record a plurality of read retry index values and a plurality of read retry weighting values respectively corresponding to a plurality of completed read retry operations. Furthermore, in response to one or more first read retry index values that have not been selected in the read retry recording table of the target block stripe, the block stripe management circuit unit is further configured to selects a target read retry index value from the one or more first read retry index values according to a read retry weighting value of the one or more first read retry index values. The processor is further configured to perform a read operation to the target block stripe by using a target read retry option corresponding to the target read retry index value. In response to determining that the read operation is successful, the block stripe management circuit unit is further configured to determine that the read retry operation is completed, and update the read retry recording table according to the target read retry index value, wherein the block stripe management circuit unit is further configured to determine whether to perform the WL operation to the target block stripe according to the latest read retry recording table.

Based on the above, the memory management method and the storage controller provided in the embodiments of the disclosure are capable of determining the more suitable read retry option by using a plurality of read retry recording tables that record the information of a plurality of read retry operations performed by a plurality of block stripes without using conventional statistics such as erase count, write count or read count, and capable of determining the block stripe that should perform the WL operation according to the plurality of read retry recording tables, thereby improving the efficiency of read retry operation and maintaining stability of data through the WL operation that is performed, such that the access efficiency and reliability of the rewritable non-volatile memory module can be enhanced.

In order to make the aforementioned features and advantages of the disclosure more comprehensible, embodiments accompanying figures are described in detail below.

BRIEF DESCRIPTION OF THE DRAWINGS

FIG. 4 is a schematic diagram illustrating a read retry recording table according to an embodiment of the disclosure.

DESCRIPTION OF EMBODIMENTS

In the embodiment, a storage device includes a rewritable non-volatile memory module and a storage device controller (a.k.a. a storage controller or a storage control circuit). Also, the storage device is usually used together with a host system so the host system can write data into or read data from the storage device.

Figure 1:
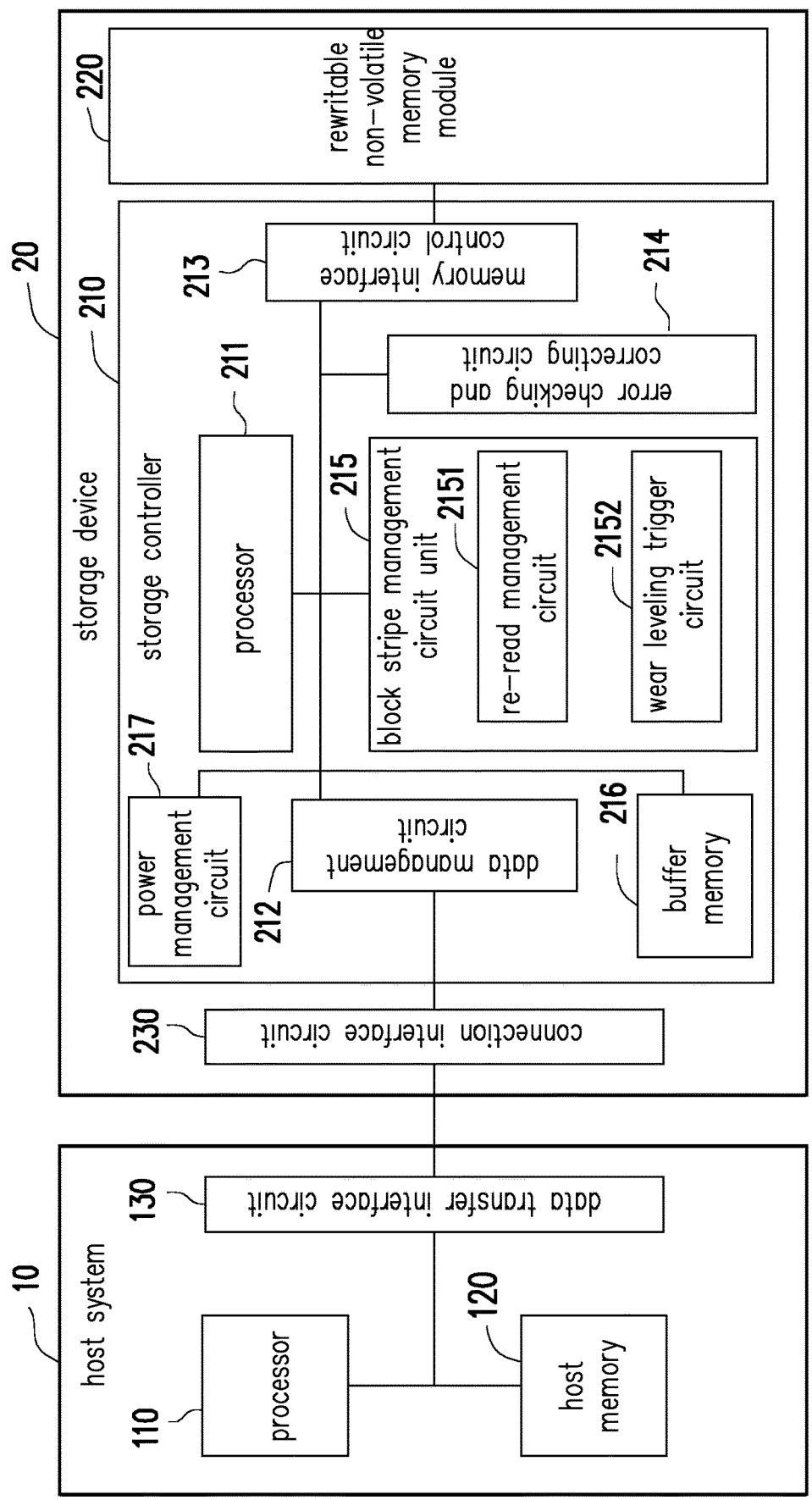
FIG. 1 is a block diagram illustrating a host system and a storage device according to an embodiment of the disclosure.

FIG. 1 is a block diagram illustrating a host system and a storage device according to an embodiment of the disclosure.

With reference to FIG. 1, a host system 10 includes a processor 110, a host memory 120 and a data transfer interface circuit 130. In this embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the disclosure is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a Serial Advanced Technology Attachment (SATA) standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In this embodiment, the host memory 120 is configured to temporarily store commands executed by the processor 110 or data. For instance, in this exemplary embodiment, the host memory 120 may be a DRAM (Dynamic Random Access Memory), or a SRAM (Static Random Access Memory) and the like. Nevertheless, it should be understood that the disclosure is not limited in this regard, and the host memory 120 may also be other appropriate memories.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It should be noted that, in the embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements. The disclosure is not limited in this regard.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each part of the storage controller 210 may also be considered as operations performed by the storage controller 210.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to the write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to perform the writing (or, programming) operation, the reading operation and the erasing operation for the rewritable non-volatile memory module 220 together with the data management circuit 212 under instruction of the processor 211.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units (a.k.a. target physical unit) corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 may further send other types of command sequences to the memory interface control circuit 213 so as to perform corresponding operations on the rewritable non-volatile memory module 220.

In addition, data to be written to the rewritable non-volatile memory module 220 is converted into a format acceptable by the rewritable non-volatile memory module 220 through the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform a corresponding operation. For example, the command sequences may include a write command sequence instructing to write data, a read command sequence instructing to read data, an erase command sequence instructing to erase data and corresponding command sequences instructing to perform various memory operations (e.g., changing a plurality of predetermined read voltage values of a predetermined read voltage set to perform a read operation, or performing a garbage collecting program and so on). The command sequences may include one or more signals, or data from the bus. The signals or the data may include command codes and program codes. For example, information such as identification codes and memory addresses are included in the read command sequence.

The rewritable non-volatile memory module 220 is coupled to the storage controller 210 (the memory interface control circuit unit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module or a vertical NAND flash memory module, or other flash memory modules or any memory module having the same characteristics. The memory cells in the rewritable non-volatile memory module 220 are disposed in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit).

In this embodiment, one physical page is used as a minimum unit for writing (programming) data. The physical unit is a minimum unit for erasing (i.e., each physical unit includes a minimum number of memory cells to be erased together). Further, the address of each of the physical pages may also be referred to as physical address.

It should be noted that, in the embodiment, the system data configured for recording information of one physical unit may be recorded by using one or more memory cells in the physical unit, or recorded by using one or more memory cells of a specific physical unit in one system region that is configured to record all of the system data.

Further, it should be understood that, when the processor 211 groups the memory cells (or the physical blocks) in the rewritable non-volatile memory module 220 for the corresponding management operations, the memory cells (or the physical blocks) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. Each logical unit may be mapped to one or more physical units, wherein the physical unit may be one or more physical addresses, one or more physical sectors, one or more physical programming units, or one or more physical erasing units. In the embodiment, the logical unit is a logical block, and the logical sub-unit is a logical page. Each logical unit includes a plurality of logical sub-units. In the embodiment, the address of the logical sub-unit may also be referred to as logical address.

Additionally, the storage controller 210 would create a logical-to-physical address mapping table and a physical-to-logical address mapping table for recording a mapping relation between the logical addresses assigned to the rewritable non-volatile memory module 220 and the physical addresses. In other words, the storage controller 210 can look up for the physical unit mapped by one logical address by using the logical-to-physical address mapping table, and the storage controller 210 can look up for the logical address mapped by one physical address by using the physical-to-logical address mapping table. Nonetheless, the technical concept for the mapping relation between the logical addresses and the physical addresses is a well-known technical means in the field, which is not repeated hereinafter. In typical operation of storage controller, the logical-to-physical address mapping table and the physical-to-logical address mapping table may be maintained in the buffer memory 216.

In this embodiment, the error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value to the processor 211.

In an embodiment, the storage controller 210 further includes a buffer memory 216 and a power management circuit 217. The buffer memory 216 is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

In the embodiment, a block stripe management circuit unit 215 includes a re-read management circuit 2151 and a wear leveling trigger circuit 2152. The block stripe management circuit unit 215 is configured to manage a plurality of block stripes of the rewritable non-volatile memory module 220, wherein the block stripe management circuit unit 215 may monitor operation state and corresponding information of the plurality of block stripes. For example, the block stripe management circuit unit 215 may identify the block stripe that is to perform the re-read operation, identify the count of re-read operations performed by the block stripe and the corresponding re-read option/index value, and identify the locations of the plurality of blocks of the block stripe. The block stripe management circuit unit 215 further determines a specific physical block or a block stripe that should perform the wear leveling operation. It should be noted that, in an embodiment, the above-mentioned block stripe management circuit unit 215 may also be integrated into the processor 211 so that the processor 211 can implement the memory management method provided by the embodiment. Or, in another embodiment, the block stripe management circuit unit 215 can be implemented as a block stripe management program code module in the form of software or firmware to enable the processor that executes the block stripe management program code module to implement the memory management method provided by the disclosure.

In the embodiment, the block stripe management circuit unit 215 uses one or more block stripes as targets for performing wear leveling operations. The concept of a block stripe is explained below with reference to FIG. 3.

Figure 3:
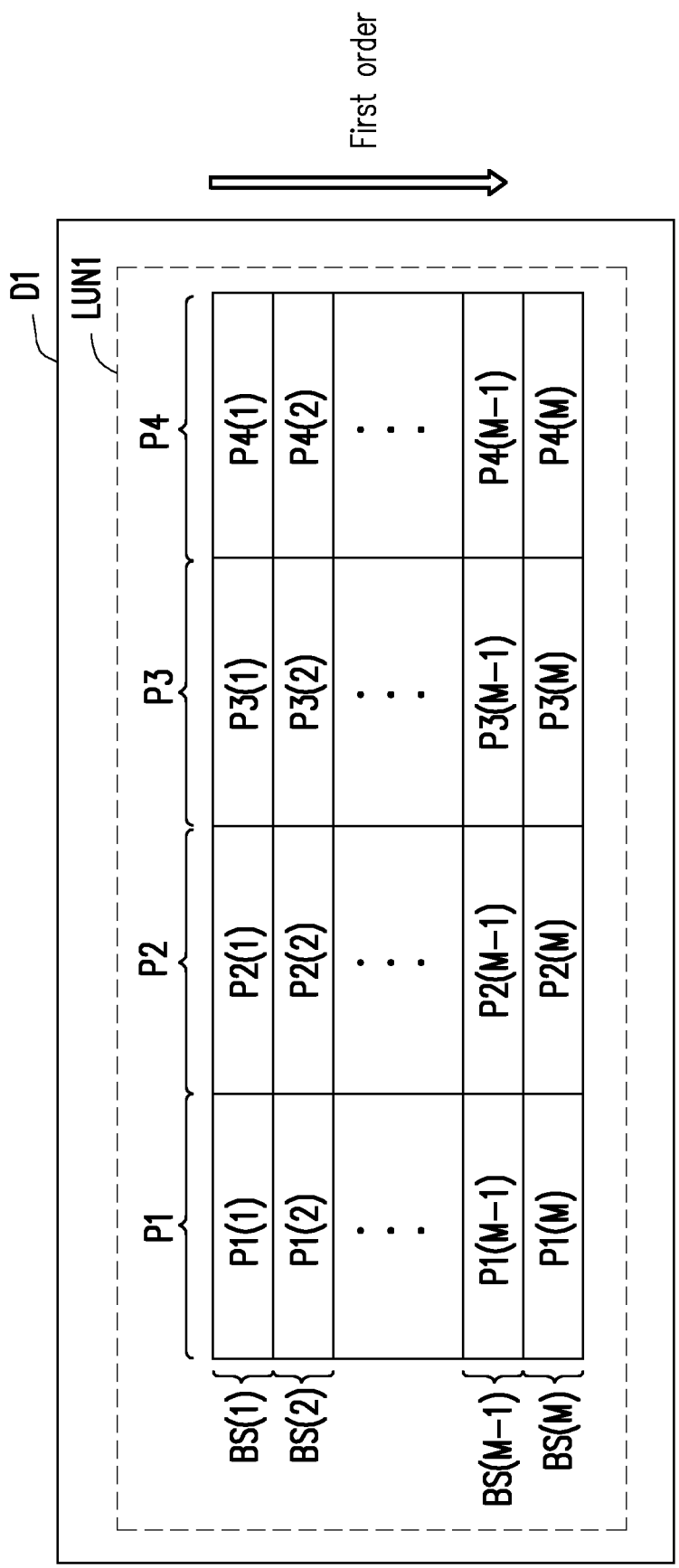
FIG. 3 is a schematic diagram illustrating a plurality of block stripes of a rewritable non-volatile memory module according to an embodiment of the disclosure.

FIG. 3 is a schematic diagram illustrating a plurality of block stripes of a rewritable non-volatile memory module according to an embodiment of the disclosure.

Referring to FIG. 3, in the embodiment, the rewritable non-volatile memory module 220 may have a plurality of packages, each package may have a plurality of physical blocks, and the plurality of physical blocks may be divided into N planes, and some or all of the planes may be logically divided into a logical unit number (LUN). For simplicity of explanation, it is assumed that the rewritable non-volatile memory module 220 has one package D1, and the package D1 has a plurality of physical blocks. The plurality of physical blocks are divided (grouped) into four planes P1 to P4 (N is equal to 4), wherein the four planes are divided into one logical number LUN1. In addition, each plane has M physical units arranged according to the first order. For example, plane P1 has M physical blocks P1(1)~P1(M); plane P2 has M physical blocks P2(1)~P2(M); plane P3 has M physical blocks P3(1)~P3(M); plane P4 has M physical blocks P4(1)~P4(M). In this embodiment, the physical blocks in the same order in each plane are grouped into a block stripe. For example, a block stripe BS(1) includes a physical block P1(1), a physical block P2(1), a physical block P3(1) and a physical block P4(1). That is to say, all the physical blocks in the above four planes may constitute M block stripes BS(1)~BS(M) arranged in the first order.

In this embodiment, the storage controller 210 sequentially writes data into a plurality of block stripes according to the order of the block stripes, and writes data according to the order of the planes P1 to P4 in the same block stripe. Assuming that all the block stripes are blank, in order to write a written data that can fill 4 physical blocks, the storage controller 210 stores the written data into all physical blocks (e.g., physical block P1(1), physical block P2(1), physical block P3(1) and physical block P4(1)) of the first blank block stripe from the first blank block stripe (blocks stripe BS(1) is used as example herein) according to the first order. For another example, if the physical block P1(1) of the block stripe BS(1) is not available for storing the data, and other physical blocks are available for storing the written data, the storage controller 210 stores the written data into the physical block P2(1) of the block stripe BS(1), the physical block P3(1) and the physical block P4(1), and the physical block P1(2) of the block stripe BS(2).

In the embodiment, the block stripe management circuit unit 215 records a read retry recording table and a read retry count value of each block stripe. When the read retry operation performed to one block stripe is completed, the information in the read retry recording table of the one block stripe is updated according to the information (e.g., corresponding read retry option) corresponding to the completed read retry operation or the corresponding read retry index value.

The details of the memory management method provided in the embodiments of the disclosure and the functions of the memory controller 210 and the block stripe management circuit unit 215 corresponding to the memory management method are described below with reference to a plurality of drawings.

Figure 2:
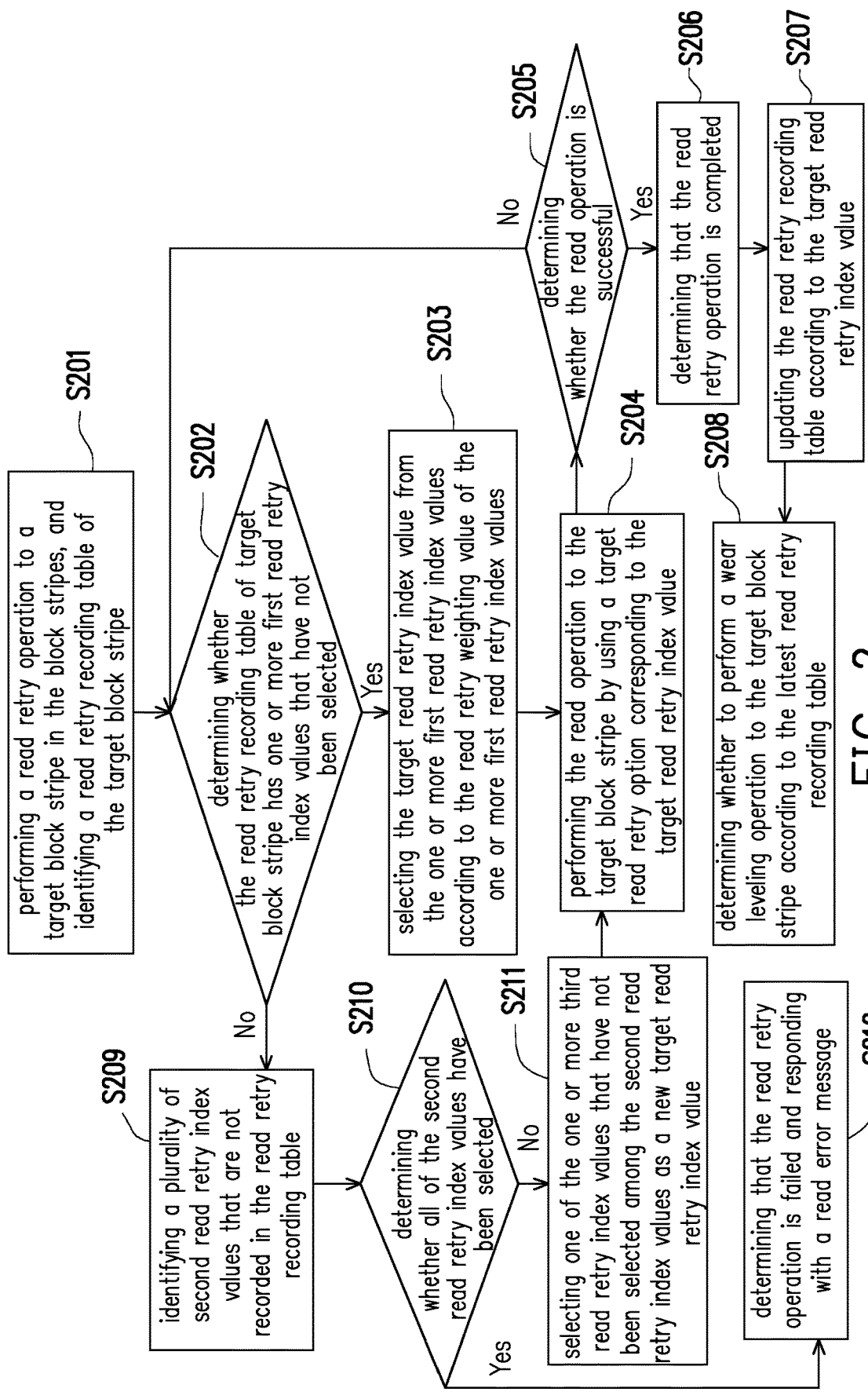
FIG. 2 is a flowchart diagram of a memory management method according to an embodiment of the disclosure.

FIG. 2 is a flowchart diagram of a memory management method according to an embodiment of the disclosure. Referring to FIG. 1 and FIG. 2, in step S201, the processor 211 instructs the block stripe management circuit unit 215 (or the re-read management circuit 2151) to perform the read retry operation to the target block stripe of the plurality of block stripes, and the block stripe management circuit unit 215 (or the re-read management circuit 2151) identifies the read retry recording table of the target block stripe.

Specifically, the processor 211 may determine to perform the read retry operation to one or more blocks in the block stripe, or one or more physical pages/word lines of one block of the block stripe when certain events occur. The block stripe may also be referred to as a target block stripe. The specific events are, for example: (1) failure of a read operation; and (2) an error bit value is greater than a threshold value of error bit value. The disclosure provides no limitation to the type of the particular event that triggers a read retry operation.

In this embodiment, in response to that the processor 211 instructs the block stripe management circuit unit 215 (or the re-read management circuit 2151) to perform the read retry operation to the target block stripe, the read retry recording table of the target block stripe is identified. The details of the read retry recording table provided by the disclosure are described below with reference to FIG. 4.

FIG. 4 is a schematic diagram illustrating a read retry recording table according to an embodiment of the disclosure. Referring to FIG. 4, a read retry recording table 400 includes a plurality of fields. The number (i.e., X) of the plurality of fields may be preset according to the needs of the manufacturer. Each field of the read retry recording table 400 records two information, including a read retry index value (RRI) and a corresponding read retry weighting value (RRW). For example, the first field of the X fields records the read retry index value RRI(1) and the corresponding read retry weighting value RRW(1).

The values of the plurality of read retry index values RRI(1) to RRI(X) recorded in the plurality of fields are different. The read retry index value may be used to identify a corresponding read retry option, i.e., different read retry options have different read retry index values. The read retry weighting values RRW(1) to RRW(X) represent the reliability of the corresponding read retry index value, that is, the higher read retry weighting value may represent that the corresponding read retry index value is used more often in reading operation and the reading result of the reading operation is successful as well.

Referring back to FIG. 2, in step S202, the block stripe management circuit unit 215 (or the re-read management circuit 2151) determines whether the read retry recording table of the target block stripe has one or more first read retry index values that have not been selected yet.

Specifically, a suitable read retry index value is first selected from the read retry recording table of the corresponding target block stripe to use the read retry option corresponding to the selected read retry index value to perform the re-read operation to the target block stripe.

In response to determining that the read retry recording table has one or more first read retry index values that have not been selected, proceeding to step S203, the block stripe management circuit unit 215 (or the re-read management circuit 2151) selects a target read retry index value from the one or more first read retry index values according to a read retry weighting value of the one or more first read retry index values. Specifically, the block stripe management circuit unit 215 (or the re-read management circuit 2151) identifies the one or more read retry weighting values corresponding to the one or more first read retry index values and identifies the size of the one or more read retry weighting values. Next, the block stripe management circuit unit 215 (or the re-read management circuit 2151) uses the largest read retry weighting value among the one or more read retry weighting values as the target read retry weighting value, and selects, from the one or more first read retry index values, a first read retry index value corresponding to the target read retry weighting value as the target read retry index value. Briefly, in the plurality of read retry index values that have not been selected, the block stripe management circuit unit 215 (or the re-read management circuit 2151) first selects a read retry index value having the largest read retry weighting value. The selected read retry index value is transmitted to the processor 211.

Next, in step S204, the processor 211 performs a read operation to the target block stripe by using a target read retry option corresponding to the target read retry index value. In general, the manufacturer of the rewritable non-volatile memory module 220 pre-sets a plurality of read retry options for performing a read retry operation. The plurality of read retry options each have a preset read voltage set. The processor 211 performs a read operation to the target block stripe by using a read voltage set corresponding to the target read retry option of the target read retry index value.

Next, in step S205, the processor 211 determines whether the read operation is successful. The disclosure provides no limitation to the manner of determining whether the read operation is successful. For example, the processor 211 performs a read operation to the target block stripe by using a read voltage set corresponding to the target read retry option of the target read retry index value, and performs a decoding operation to the read data to obtain a corresponding error bit value. The processor 211 may further determine whether the read operation is successful according to whether the error bit value is greater than the error bit value threshold. For example, if it is determined that the error bit value is greater than the error bit value threshold, the processor 211 determines that the read operation is failed (the decoding operation is failed). On the other hand, if it is determined that the error bit value is not greater than the error bit value threshold, the processor 211 determines that the read operation is successful (the decoding operation is successful).

In response to determining that the read operation is successful, proceeding to step S206, the block stripe management circuit unit 215 (or the re-read management circuit 2151) determines that the read retry operation is completed. Next, in step S207, the block stripe management circuit unit 215 (or the re-read management circuit 2151) updates the read retry recording table according to the target read retry index value.

Specifically, when the read retry option that is used can correctly read the target block stripe, the block stripe management circuit unit 215 (or the re-read management circuit 2151) determines that the current read retry operation is completed, and further updates the read retry recording table according to the information corresponding to this read retry option (the operation of updating read retry recording table is described in details below with reference to FIG. 5).

On the contrary, in response to determining that the read operation is unsuccessful (failed), the overall process flow returns to step S202 to attempt to select a new target read retry index value from the one or more unselected first read retry index values in the read retry recording table.

If all of the read retry index values in the read retry recording table have been selected (in response to determining that the read retry recording table of the target block stripe no longer has one or more first read retry index values that have not been selected), proceeding to step S209, the block stripe management circuit unit 215 (or the re-read management circuit 2151) identifies a plurality of second read retry index values that are not recorded in the read retry recording table. Next, in step S210, the block stripe management circuit unit 215 (or the re-read management circuit 2151) determines whether the plurality of second read retry index values have been selected.

In response to determining that the plurality of second read retry index values have not been selected, proceeding to step S211, the block stripe management circuit unit 215 (or the re-read management circuit 2151) selects one of the one or more unselected third read retry index values among the plurality of second read retry index values as a new target read retry index value. That is, if there are a plurality of third read retry index values that have not been selected among all of the second read retry index values other than the read retry recording table, the block stripe management circuit unit 215 (or the re-read management circuit 2151) selects one of them as the new target read retry index value to perform step S204.

However, in response to determining that the plurality of second read retry index values have been selected (i.e., all of the plurality of second read retry index values are selected as target read retry index values to perform step S204) proceeding to step S212, the block stripe management circuit unit 215 (or the re-read management circuit 2151) determines that the read retry operation is failed, and responds with a read error message. In other words, the read retry options corresponding to all of the read retry index values have already been used to read the target block stripe, and none of the read retry operations is successful. On this occasion, the block stripe management circuit unit 215 (or the re-read management circuit 2151) determines that the read retry operation is failed, and responds with the read error message.

Figure 5:
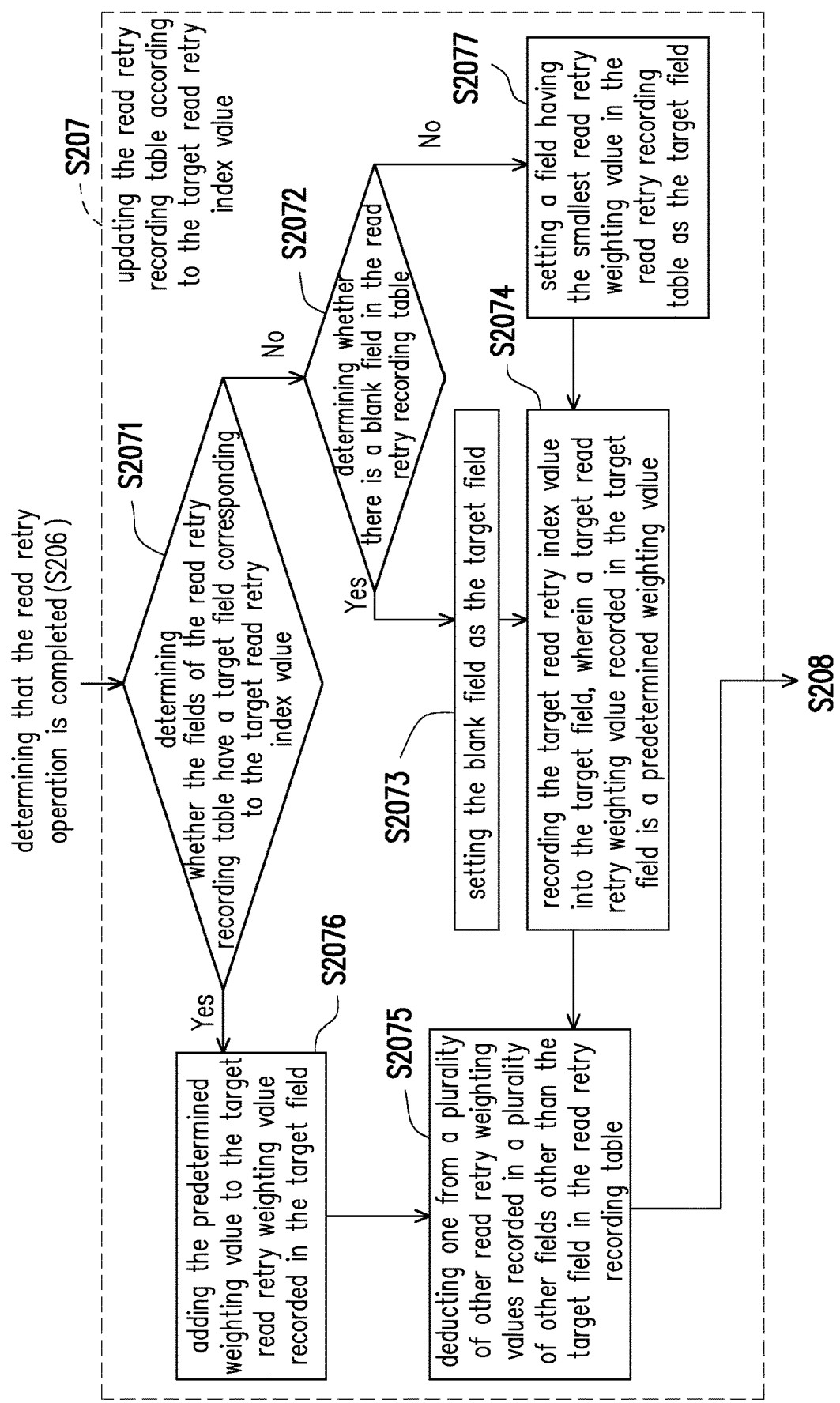
FIG. 5 is a flowchart diagram illustrating step S207 of FIG. 2 according to an embodiment of the disclosure.

FIG. 5 is a flowchart diagram illustrating step S207 (updating the read retry recording table according to the target read retry index value) of FIG. 2 according to an embodiment of the disclosure.

Referring to FIG. 5, in step S2071, the block stripe management circuit unit 215 (or the re-read management circuit 2151) determines whether or not the plurality of fields in the read retry recording table have a target field corresponding to the target read retry index value. Specifically, after the read operation corresponding to the target read retry index value is successful, the block stripe management circuit unit 215 (or the re-read management circuit 2151) determines whether the read retry recording table has recorded the target read retry index value.

In response to determining that the plurality of fields in the read retry recording table do not have a target field corresponding to the target read retry index value, proceeding to step S2072, the block stripe management circuit unit 215 (or re-read management circuit 2151) determines whether there is a blank field in the read retry recording table.

In response to determining that the read retry recording table has a blank field, proceeding to step S2073, the block stripe management circuit unit 215 (or the re-read management circuit 2151) sets the blank field as the target field. Next, in step S2074, the block stripe management circuit unit 215 (or the re-read management circuit 2151) records the target read retry index value into the target field, wherein the target read retry weighting value recorded in the target field is a predetermined weighting value. In the embodiment, the predetermined weighting value is a positive integer (i.e., Y) which is greater than or equal to the sum (i.e., X) of all fields in the read retry recording table deducted by 1 (i.e., Y≥(X−1)). X is a positive integer greater than one.

Figure 7A:
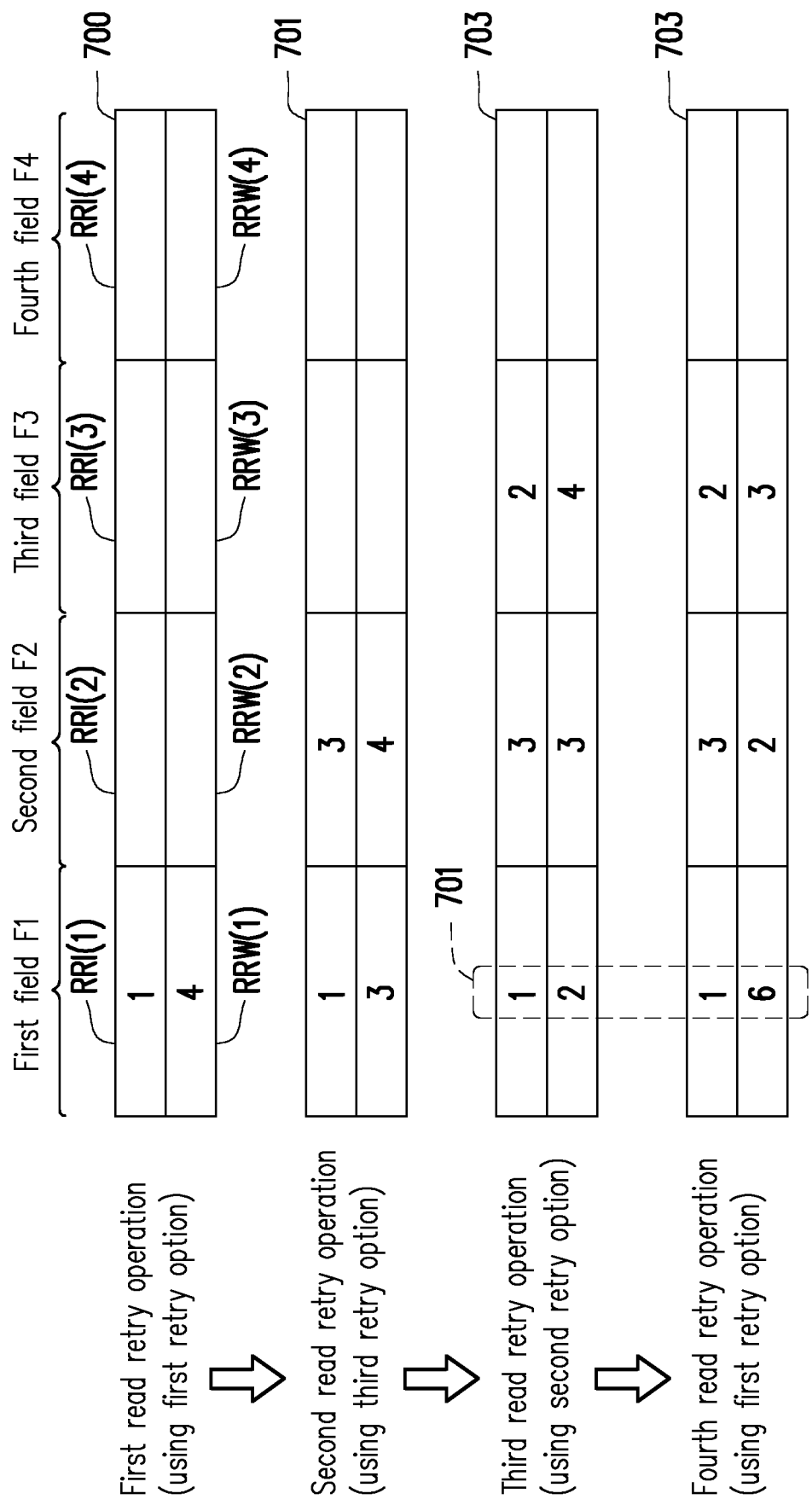
FIG. 7A and FIG. 7B are schematic diagrams illustrating updating a read retry recording table according to an embodiment of the disclosure.
Figure 7B:
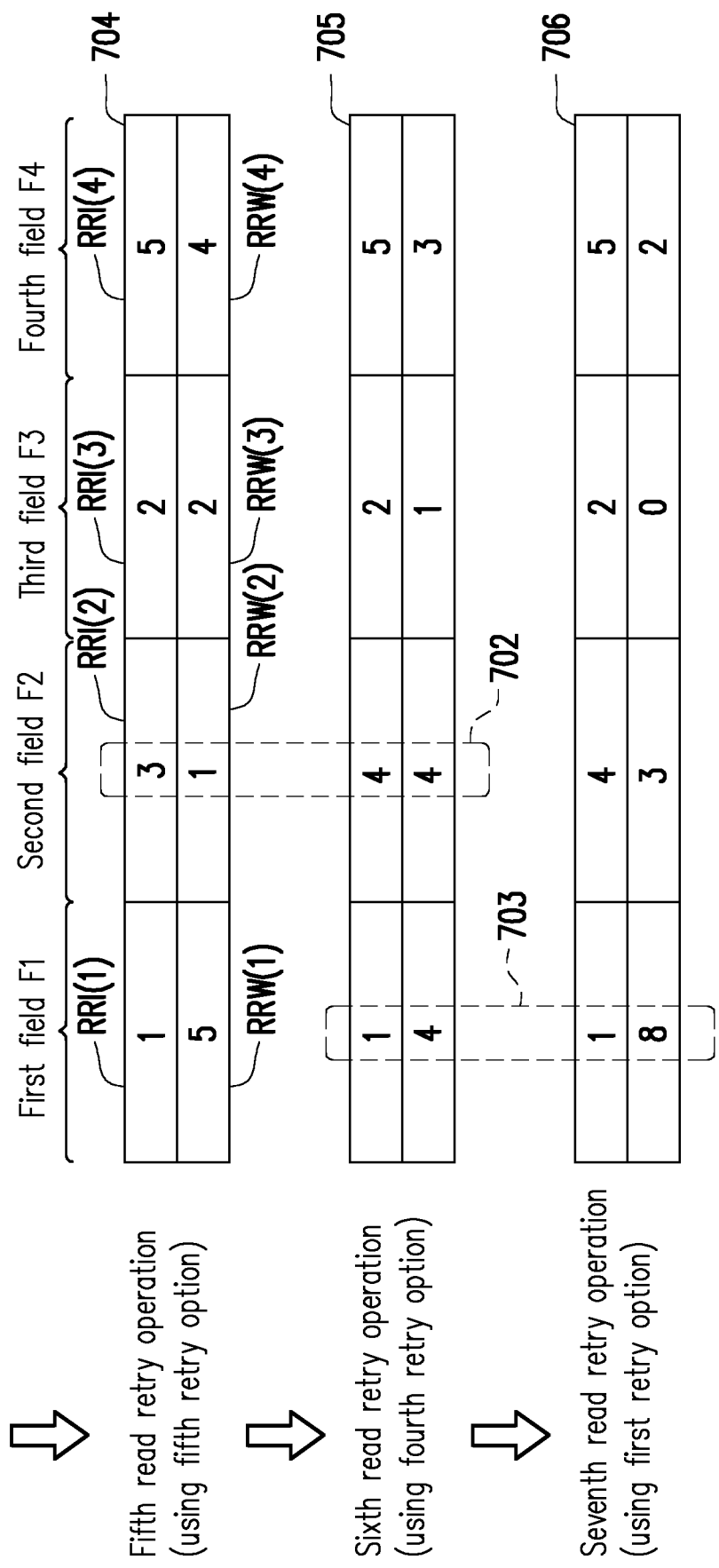

FIG. 7A and FIG. 7B are provided below as examples. FIG. 7A and FIG. 7B are schematic diagrams illustrating updating a read retry recording table according to an embodiment of the disclosure.

Please refer to FIG. 7A first. For example, it is assumed that the read retry recording table of the target block stripe is blank, X is equal to 4, and Y is equal to 4. In addition, the first read retry operation is successful, and the first read retry option is used (i.e., the corresponding target read retry index value is "1"). The block stripe management circuit unit 215 (or the re-read management circuit 2151) is to perform step S207 to update the target read retry index value into the read retry recording table of the target block stripe. Initially, since a read retry recording table 700 is preset to be blank, that is, there is no target field corresponding to the target read retry index value (step S2071→No), the block stripe management circuit unit 215 (or re-read management circuit 2151) sets one of the four fields F1 to F4 as the target field to store the target read retry index value. For example, the first field F1 is set as the target field (step S2072→Yes). Next, the block stripe management circuit unit 215 (or the re-read management circuit 2151) records the first field F1 according to the target read retry index value "1", wherein the read retry index value RRI(1) in the first field F1 is recorded as "1", and the read retry weighting value RRW(1) in the first field F1 is recorded as "4" (step S2074).

Returning to FIG. 5, next, in step S2075, the block stripe management circuit unit 215 (or the re-read management circuit 2151) deducts 1 from the plurality of other read retry weighting values recorded by other fields other than the target field in the read retry recording table.

Specifically, not only that the target read retry weighting value is updated, the read retry weighting value in other fields with recorded information is also updated, i.e., deducted by 1. That is, the read retry weighting values corresponding to other non-target read retry index values are reduced. It should be noted that after the step S2075 is completed, the overall process flow of step S207 is completed, that is, the operation of updating the read retry recording table is completed.

For example, referring to FIG. 7A, following the example of the read retry recording table 700 of FIG. 7A above, it is assumed that the second read retry operation is successful, and the third read retry option is used (i.e., the corresponding target read retry index value is "3"). The block stripe management circuit unit 215 (or the re-read management circuit 2151) sets the blank second field F2 as the target field. The block stripe management circuit unit 215 (or the re-read management circuit 2151) records the target field (i.e., the second field F2) according to the target read retry index value "3", wherein the read retry index value RRI(2) in the second field F2 is recorded as "3", and the read retry weighting value RRW(2) in the second field F2 is recorded as "4" (step S2074). Further, the block stripe management circuit unit 215 (or the re-read management circuit 2151) deducts 1 (i.e., become "3") from the read retry weighting value RRW(1) in the first field F1 other than the second field F2 (step S2075). That is, after the second read retry operation is completed, the read retry recording table 700 is updated into the read retry recording table 701.

Referring back to FIG. 5, in step S2071, if the block stripe management circuit unit 215 (or the re-read management circuit 2151) determines that the plurality of fields of the read retry recording table have the target field corresponding to the target read retry index value, proceeding to step S2076, and the block stripe management circuit unit 215 (or the re-read management circuit 2151) adds the predetermined weighting value to the target read retry weighting value recorded in the target field. That is, if the read retry recording table already has the target read retry index value, the block stripe management circuit unit 215 (or the re-read management circuit 2151) directly adds the predetermined weighting value to the target read retry weighting value of the target read retry index value, thereby enhancing the weight of the target read retry index value.

For example, referring to FIG. 7A, in continuation to the example of the read retry recording table 702 of FIG. 7A above, it is assumed that the fourth read retry operation is successful, and the first read retry option is used (i.e., the corresponding target read retry index value is "1"). The block stripe management circuit unit 215 (or the re-read management circuit 2151) determines that the read retry recording table 702 already has a target field (i.e., the first field F1) corresponding to the target read retry index value "1", and adds 4 (predetermined weighting value) to the read retry weighting value RRW(1) "2" in the first field F1, that is, become "6" (step S2076) (for example, as indicated by the box D701 illustrated in dashed boarder). In addition, the block stripe management circuit unit 215 (or the re-read management circuit 2151) deducts 1 from the read retry weighting values RRW(2) and RRW(3) in the fields F2 and F3 other than the first field F1 (i.e., the read retry weighting value RRW(2) is changed from "3" into "2", and the read retry weighting value RRW(2) is changed from "4" into "3") (step S2075). That is, after the fourth read retry operation is completed, the read retry recording table 702 is updated into the read retry recording table 703.

In another example, referring to FIG. 7B, in continuation to the example of the read retry recording table 705 of FIG. 7B, it is assumed that the seventh read retry operation is successful, and the first read retry option is used (i.e., the corresponding target read retry index value is "1"). The block stripe management circuit unit 215 (or the re-read management circuit 2151) determines that the read retry recording table 705 already has a target field (i.e., the first field F1) corresponding to the target read retry index value "1", and adds 4 (predetermined weighting value) to the read retry weighting value RRW(1) "4" in the first field F1, that is, become "8" (step S2076) (for example, as indicated by the box D703 illustrated in dashed boarder). In addition, the block stripe management circuit unit 215 (or the re-read management circuit 2151) deducts 1 from the read retry weighting values RRW(2), RRW(3) and RRW(4) in the fields F2, F3 and F4 other than the first field F1 (i.e., the read retry weighting value RRW(2) is changed from "4" into "3"; the read retry weighting value RRW(3) is changed from "1" into "0"; the read retry weighting value RRW(4) is changed from "3" into "2") (step S2075). That is, after the seventh read retry operation is completed, the read retry recording table 705 is updated into the read retry recording table 706.

Referring back to FIG. 5, in step S2072, if the block stripe management circuit unit 215 (or the re-read management circuit 2151) determines that the read retry recording table does not have a blank field, proceeding to step S2077, the block stripe management circuit unit 215 (or the re-read management circuit 2151) sets a field having the smallest read retry weighting value in the read retry recording table as the target field. Next, in the subsequent step S2074, the block stripe management circuit unit 215 (or the re-read management circuit 2151) records the target read retry index value into the target field. In other words, the field having the smallest read retry weighting value is cleared to serve as the target field for recording the information corresponding to the target read retry index value, or directly written by the information corresponding to the target read retry index value.

For example, referring to FIG. 7B, in continuation to the example of the read retry recording table 704 of FIG. 7B, it is assumed that the sixth read retry operation is successful, and the fourth read retry option is used (i.e., the corresponding target read retry index value is "4"). The block stripe management circuit unit 215 (or the re-read management circuit 2151) determines that the read retry recording table 704 does not have the target field corresponding to the target read retry index value "4" (step S2071→No), and determines that the read retry recording table 704 does not have a blank field (step S2072→No). Next, the block stripe management circuit unit 215 identifies the smallest read retry weighting value "1" in the read retry recording table 704 and sets the corresponding second field F2 as the target field. Then, the target read retry index value "4" and the corresponding predetermined weighting value are recorded into the second field F2 (step S2074) (e.g., indicated by box D702 shown in dashed boarder). In addition, the block stripe management circuit unit 215 (or the re-read management circuit 2151) deducts 1 from the read retry weighting values RRW(1), RRW(3) and RRW(4) in the fields F1, F3 and F4 other than the second field F1. That is, after the sixth read retry operation is completed, the read retry recording table 704 is updated into the read retry recording table 705.

Figure 6:
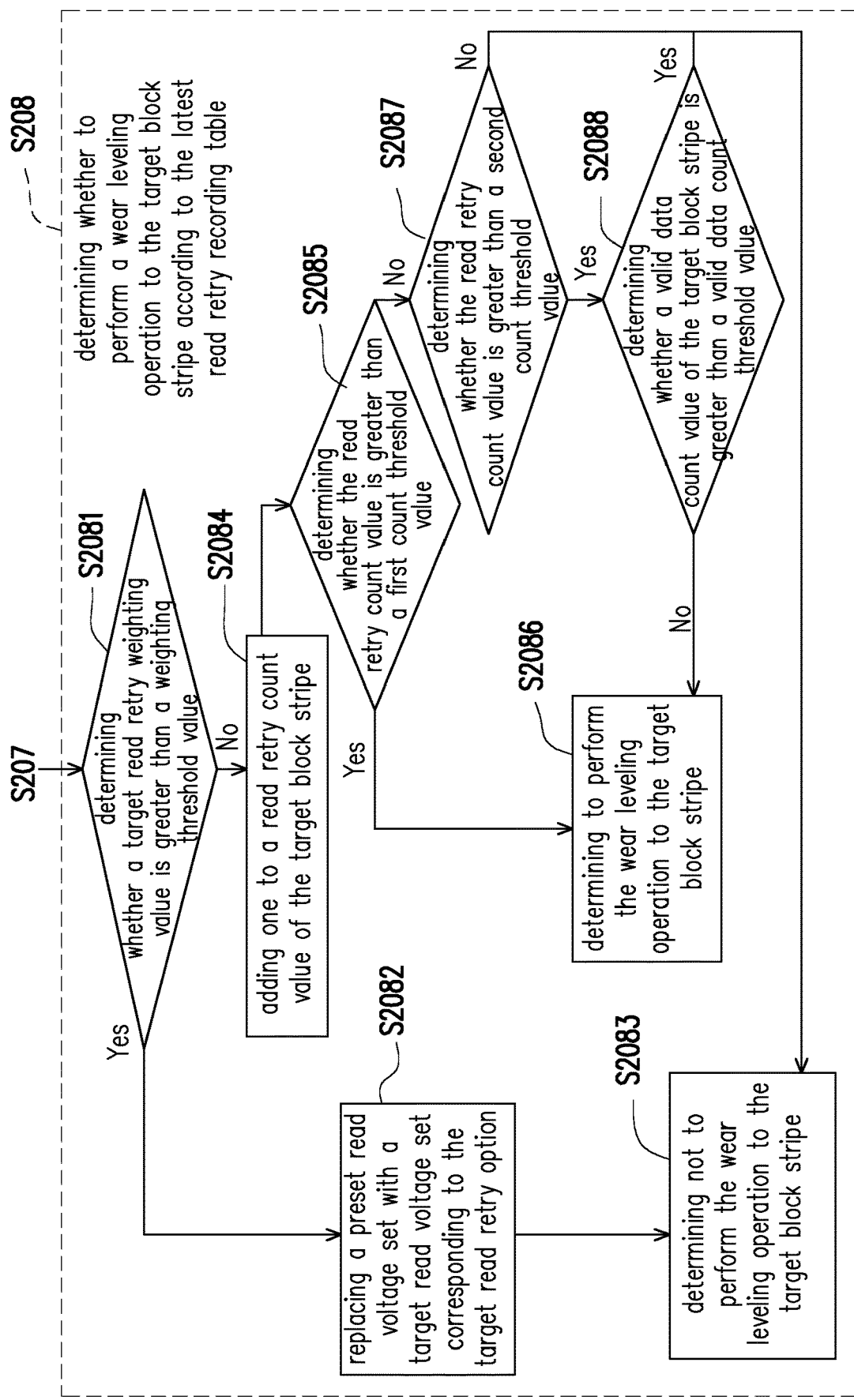
FIG. 6 is a flowchart diagram illustrating step S208 of FIG. 2 according to an embodiment of the disclosure.

FIG. 6 is a flowchart diagram illustrating step S208 (determining whether to perform wear leveling operation to the target block stripe according to the latest read retry recording table) of FIG. 2 according to an embodiment of the disclosure.

Referring to FIG. 6, in step S2081, the block stripe management circuit unit 215 (or the re-read management circuit 2151) determines whether the target read retry weighting value is greater than the weighting threshold value. The weighting threshold value is preset, and the disclosure provides no limitation to the specific value of the weighting threshold value.

In response to the determining that the target read retry weighting value is greater than the weighting threshold value (S2081→Yes), proceeding to step S2082, the block stripe management circuit unit 215 (or the re-read management circuit 2151) replaces the preset read voltage set with the target read voltage set corresponding to the target read retry option. Specifically, if the target read retry weighting value is greater than the weighting threshold value, the block stripe management circuit unit 215 (or the re-read management circuit 2151) considers that the reliability of the target read retry option corresponding to the target read retry index value is high. Therefore, the block stripe management circuit unit 215 (or the re-read management circuit 2151) replaces the original preset read voltage set for reading the target block stripe with the read voltage set (also referred to as the target read voltage set) corresponding to the target read retry option. That is, when the read operation is performed to the target block stripe next time, the processor 211 directly uses the target read voltage set to read the target block stripe.

Next, in step S2083, the block stripe management circuit unit 215 (or the wear leveling trigger circuit 2152) determines not to perform the wear leveling operation to the target block stripe. Moreover, the block stripe management circuit unit 215 completes the overall operation of step S208 performed this time.

In addition, in response to determining that the target read retry weighting value is not greater than the weighting threshold value (step S2081→NO), proceeding to step S2084, the block stripe management circuit unit 215 (or the wear leveling trigger circuit 2152) adds one to the read retry count value of the target block stripe.

Specifically, unless the target read retry weighting value is greater than the weighting threshold value, every time when the read retry recording table is updated by the target read retry index value and the target read retry weighting value, the block stripe management circuit unit 215 (or wear leveling trigger circuit 2152) adds one to the read retry count value of the target block stripe. In other words, the large read retry count value reflects that the target block stripe performs the read retry operation many times. In particular, if the target read retry option is changed frequently (causing the target read retry weighting value to be no greater than the weighting threshold value), the value of the read retry count value increases more.

Next, in step S2085, the block stripe management circuit unit 215 (or the wear leveling trigger circuit 2152) determines whether the read retry count value is greater than a first count threshold value.

In response to determining that the read retry count value is greater than the first count threshold value (step S2085→YES), proceeding to step S2086, the block stripe management circuit unit 215 (or the wear leveling trigger circuit 2152) determines to perform the wear leveling operation to the target block stripe, and the block stripe management circuit unit 215 (or the wear leveling trigger circuit 2152) completes the overall operation of the step S208 performed this time. For example, the block stripe management circuit unit 215 (or wear leveling trigger circuit 2152) notifies the processor 211 that the target block stripe needs to perform the wear leveling operation.

In response to determining that the read retry count value is not greater than the first count threshold value (step S2085→NO), proceeding to step S2087, the block stripe management circuit unit 215 (or the wear leveling trigger circuit 2152) determines whether the read retry count value is greater than a second count threshold value. The second count threshold value is less than the first count threshold value.

In response to determining that the read retry count value is greater than the second count threshold value, proceeding to step S2088, the block stripe management circuit unit 215 (or the wear leveling trigger circuit 2152) determines whether the valid data count value of the target block stripe is greater than the valid data count threshold value.

The valid data count value for each block stripe is the quotient obtained by dividing the total amount (total size) of all valid data stored in the block stripe by the size of a predetermined unit. In the embodiment, the predetermined unit is set as one physical page, but the disclosure is not limited thereto. For example, in other embodiments, the predetermined unit may be set to a size of two physical pages or more. For another example, in other embodiments, the predetermined unit may be set with one or more codewords, one or more word lines, a plurality of sectors and one physical block.

In response to determining that the valid data count value of the target block stripe is not greater than the valid data count threshold value, proceeding to step S2086, the block stripe management circuit unit 215 (or the wear leveling trigger circuit 2152) determines to perform the wear leveling operation to the target block stripe. On the contrary, in response to determining that the valid data count value of the target block stripe is greater than the valid data count threshold value, proceeding to step S2083, the block stripe management circuit unit 215 (or the wear leveling trigger circuit 2152) determines not to perform the wear leveling operation to the target block stripe.

In other words, through steps S2087~S2088, the block stripe management circuit unit 215 (or the wear leveling trigger circuit 2152) may further determine the amount of valid data stored in the target block stripe by using the valid data count value of the target block stripe, and when the amount of valid data is large (the valid data count is greater than the valid data count threshold value), determine not to perform the wear leveling operation to the target block stripe to avoid performing the wear leveling operation to more valid data and causing longer delay.

In addition, in response to determining that the read retry count value is not greater than the second count threshold value, proceeding to step S2083, the block stripe management circuit unit 215 (or the wear leveling trigger circuit 2152) determines not to perform the wear leveling operation to the target block stripe.

In summary, the memory management method and the storage controller provided in the embodiments of the disclosure are capable of determining the more suitable read retry option by using a plurality of read retry recording tables that record the information of a plurality of read retry operations performed by a plurality of block stripes without using conventional statistics such as erase count, write count or read count, and capable of determining the block stripe that should perform the WL operation according to the plurality of read retry recording tables, thereby improving the efficiency of read retry operation and maintaining stability of data through the WL operation that is performed, such that the access efficiency and reliability of the rewritable non-volatile memory module can be enhanced.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A memory management method, adapted for a storage device equipped with a rewritable non-volatile memory module, wherein the rewritable non-volatile memory module has a plurality of physical blocks, wherein the physical blocks are grouped into a plurality of block stripes, the method comprising:

performing a read retry operation to a target block stripe in the block stripes, and identifying a read retry recording table of the target block stripe, wherein the read retry recording table records a plurality of fields, wherein the plurality of field record a plurality of read retry index values and a plurality of read retry weighting values respectively corresponding to a plurality of completed read retry operations;

in response to that the read retry recording table of target block stripe has one or more first read retry index values that have not been selected, selecting one target read retry index value from the one or more first read retry index values according to a read retry weighting value of the one or more first read retry index values;

performing a read operation to the target block stripe by using a target read retry option corresponding to the target read retry index value;

in response to determining that the read operation is successful, determining that the read retry operation is completed, and updating the read retry recording table according to the target read retry index value; and determining whether to perform a wear leveling operation to the target block stripe according to the latest read retry recording table.

2. The memory management method according to claim 1, further comprising:

in response to that the read retry recording table of target block stripe does not have the one or more first read retry index values that have not been selected, identifying a plurality of second read retry index values that are not recorded in the read retry recording table;

determining whether all of the second read retry index values have been selected;

in response to that not all of the second read retry index values are selected, selecting one of the one or more third read retry index values that have not been selected among the second read retry index values as a new target read retry index value;

performing the read operation to the target block stripe by using a target read retry option corresponding to the target read retry index value; and in response to that all of the second read retry index values have been selected, determining that the read retry operation is failed and responding with a read error message.

3. The memory management method according to claim 1, wherein the step of selecting the target read retry index value from the one or more first read retry index values according to the read retry weighting value of the one or more first read retry index values comprises:

setting a largest read retry weighting value of the one or more read retry weighting value as a target read retry weighting value; and selecting, from the one or more first read retry index values, a first read retry index value corresponding to the target read retry weighting value as the target read retry index value.

4. The memory management method according to claim 1, wherein the step of updating the read retry recording table according to the target read retry index value comprises the following steps:

(1) determining whether the fields of the read retry recording table have a target field corresponding to the target read retry index value, in response to determining that the read retry recording table does not have the target field corresponding to the target read retry index value, performing step (2), in response to determining that the read retry recording table has the target field corresponding to the target read retry index value, performing step (5);

(2) determining whether there is a blank field in the read retry recording table, in response to determining that the read retry recording table does not have a blank field, performing step (3), in response to determining that the read retry recording table does not have a blank field, performing step (4);

(3) setting a field having the smallest read retry weighting value in the read retry recording table as the target field, and performing step (4);

(4) recording the target read retry index value into the target field, wherein a target read retry weighting value recorded in the target field is a predetermined weighting value, and performing step (6);

(5) adding the predetermined weighting value to the target read retry weighting value recorded in the target field; and (6) deducting one from a plurality of other read retry weighting values recorded in a plurality of other fields other than the target field in the read retry recording table, and completing the overall step of updating the read retry recording table according to the target read retry index value.

5. The memory management method according to claim 4, wherein the number of the plurality of fields is set as X, wherein the predetermined weighting value is set to be a positive integer greater than or equal to (X−1).

6. The memory management method according to claim 1, wherein the step of determining whether to perform a wear leveling operation to the target block stripe according to the latest read retry recording table comprises the following steps:

(1) determining whether a target read retry weighting value is greater than a weighting threshold value;

in response to determining that the target read retry weighting value is greater than the weighting threshold value, performing step (2), in response to determining that the target read retry weighting value is not greater than the weighting threshold value, performing step (4);

(2) replacing a preset read voltage set with a target read voltage set corresponding to the target read retry option;

(3) determining not to perform the wear leveling operation to the target block stripe, and completing the overall step of determining whether to perform the wear leveling operation to the target block stripe according to the latest read retry recording table;

(4) adding one to a read retry count value of the target block stripe;

(5) determining whether the read retry count value is greater than a first count threshold value, in response to determining that the read retry count value is greater than the first count threshold value, performing step (8), in response to determining that the read retry count value is not greater than the first count threshold value, performing step (6);

(6) determining whether the read retry count value is greater than a second count threshold value, in response to determining that the read retry count value is greater than the second count threshold value, performing step (7), in response to that the read retry count value is not greater than the second count threshold value, performing step (3);

(7) determining whether a valid data count value of the target block stripe is greater than a valid data count threshold value, in response to determining that a valid data count value of the target block stripe is greater than the valid data count threshold value, performing step (3), in response to determining that the valid data count value of the target block stripe is not greater than the valid data count threshold value, performing step (8); and (8) determining to perform the wear leveling operation to the target block stripe, and completing the overall step of determining whether to perform the wear leveling operation to the target block stripe according to the latest read retry recording table.

7. A storage controller for controlling a storage device equipped with a rewritable non-volatile memory module, the storage controller comprising:

a connection interface circuit, coupled to a host system;

a memory interface control circuit, coupled to the rewritable non-volatile memory module, wherein the rewritable non-volatile memory module has a plurality of physical blocks, wherein the physical blocks are grouped into a plurality of block stripes;

a block stripe management circuit unit; and a processor, coupled to the connection interface circuit, the memory interface control circuit, and the block stripe management circuit unit, wherein the processor instructs the block stripe management circuit unit to perform a read retry operation on a target block stripe in the block stripes, wherein the block stripe management circuit unit identifies a read retry recording table of the target block stripe, wherein the read retry recording table records a plurality of fields, wherein the plurality of fields record a plurality of read retry index values and a plurality of read retry weighting values respectively corresponding to a plurality of completed read retry operations, in response to that read retry recording table of the target block stripe having one or more first read retry index values that have not been selected, the block stripe management circuit unit is further configured to select a target read retry index value from the one or more first read retry index values by using a read retry weighting value of the one or more first read retry index value, wherein the processor is further configured to perform a read operation to the target block stripe by using a target read retry option corresponding to the target read retry index value, in response to determining that the read operation is successful, the block stripe management circuit unit is further configured to determine that the read retry operation is completed, and update the read retry recording table according to the target read retry index value, wherein block stripe management circuit unit is further configured to determine whether to perform a wear leveling operation to the target block stripe according to the latest read retry recording table.

8. The storage controller according to claim 7, wherein in response to that the read retry recording table of the target block stripe not having the one or more first read retry index values that have not been selected, the block stripe management circuit unit identifies a plurality of second read retry index values not recorded in the read retry recording table, wherein the block stripe management circuit unit determines whether all of the second read retry index values have been selected, in response to that not all of the second read retry index values are selected, the block stripe management circuit unit selects one of one or more third read retry index values that have not been selected from the second read retry index values as a new target read retry index value, wherein the block stripe management circuit unit performs the read operation to the target block stripe by using a target read retry option corresponding to the target read retry index value, in response to that all of the second read retry index values have been selected, it is determined that the read retry operation is failed, and responding with a read error message.

9. The storage controller according to claim 7, wherein in the operation that the block stripe management circuit unit is further configured to select the target read retry index value from the one or more first read retry index values according to the read retry weighting value of the one or more first read retry index values, the block stripe management circuit unit sets a largest read retry weighting value of the one or more read retry weighting values as a target read retry weighting value, wherein the block stripe management circuit unit selects, from the one or more first read retry index values, a first read retry index value corresponding to the target read retry weighting value as the target read retry index value.

10. The storage controller according to claim 7, wherein the operation that block stripe management circuit unit is further configured to update the read retry recording table according to the target read retry index value comprises the following steps:

(1) determining whether the fields of the read retry recording table have a target field corresponding to the target read retry index value, in response to determining that the read retry recording table does not have the target field corresponding to the target read retry index value, performing step (2), in response to determining that the read retry recording table has the target field corresponding to the target read retry index value, performing step (5);

(2) determining whether there is a blank field in the read retry recording table,
in response to determining that the read retry recording table does not have a blank field, performing step (3),
in response to determining that the read retry recording table does have a blank field, performing step (4);
(3) setting a field having the smallest read retry weighting value in the read retry recording table as the target field, and performing step (4);
(4) recording the target read retry index value into the target field, wherein a target read retry weighting value recorded in the target field is a predetermined weighting value, and performing step (6);
(5) adding the predetermined weighting value to the target read retry weighting value recorded in the target field; and
(6) deducting one from a plurality of other read retry weighting values recorded in a plurality of other fields other than the target field in the read retry recording table, and completing the overall step of updating the read retry recording table according to the target read retry index value.

11. The storage controller according to claim 10, wherein the number of the plurality of fields is set as X,
wherein the predetermined weighting value is set to be a positive integer greater than or equal to (X−1).

12. The storage controller according to claim 7, wherein the operation that the block stripe management circuit unit is further configured to determine whether to perform a wear leveling operation to the target block stripe according to the latest read retry recording table comprises the following steps:
(1) determining whether a target read retry weighting value is greater than a weighting threshold value,
in response to determining that the target read retry weighting value is greater than the weighting threshold value, performing step (2),
in response to determining that the target read retry weighting value is not greater than the weighting threshold value, performing step (4);
(2) replacing a preset read voltage set with a target read voltage set corresponding to the target read retry option;
(3) determining not to perform the wear leveling operation to the target block stripe, and completing the overall step of determining whether to perform a wear leveling operation to the target block stripe according to the latest read retry recording table;
(4) adding one to a read retry count value of the target block stripe;
(5) determining whether the read retry count value is greater than a first count threshold value,
in response to determining that the read retry count value is greater than the first count threshold value, performing step (8),
in response to determining that the read retry count value is not greater than the first count threshold value, performing step (6);
(6) determining whether the read retry count value is greater than a second count threshold value,
in response to determining that the read retry count value is greater than the second count threshold value, performing step (7),
in response to determining that the read retry count value is not greater than the second count threshold value, performing step (3);
(7) determining whether a valid data count value of the target block stripe is greater than a valid data count threshold value,
in response to determining that the valid data count value of the target block stripe is greater than the valid data count threshold value, performing step (3),
in response to determining that the valid data count value of the target block stripe is not greater than the valid data count threshold value, performing step (8); and
(8) determining to perform the wear leveling operation to the target block stripe, and completing the overall step of determining whether to perform the wear leveling operation to the target block stripe according to the latest read retry recording table.

* * * * *